United States Patent
Yatsu

(10) Patent No.: US 6,943,977 B2
(45) Date of Patent: Sep. 13, 2005

(54) METHOD AND APPARATUS FOR SERVO WRITING IN A DISK DRIVE

(75) Inventor: Masahide Yatsu, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 136 days.

(21) Appl. No.: 10/629,918

(22) Filed: Jul. 30, 2003

(65) Prior Publication Data

US 2004/0075935 A1 Apr. 22, 2004

(30) Foreign Application Priority Data

Jul. 31, 2002 (JP) ........................................ 2002-223524

(51) Int. Cl.$^7$ ............................................. G11B 21/02
(52) U.S. Cl. ..................................... 360/75; 360/77.08
(58) Field of Search ............................. 360/58, 61, 62, 360/75, 76, 77.02, 77.05, 77.06, 77.07, 77.08, 77.09, 78.01, 78.04, 78.14

(56) References Cited

U.S. PATENT DOCUMENTS

| 5,757,574 A | * | 5/1998 | Chainer et al. ............... 360/75 |
| 6,600,621 B1 | * | 7/2003 | Yarmchuk .................... 360/75 |
| 6,643,082 B1 | * | 11/2003 | Belser ........................ 360/48 |

FOREIGN PATENT DOCUMENTS

| JP | 1-208777 | 8/1989 |
| JP | 5-2729 A | 1/1993 |
| JP | 7-37344 A | 2/1995 |
| JP | 8-212733 | 8/1996 |
| JP | 2001-143416 | 5/2001 |
| JP | 2001-243733 | 9/2001 |

OTHER PUBLICATIONS

Japanese Office Action dated Apr. 19, 2005 for Appl. No. 2002-223524.

* cited by examiner

*Primary Examiner*—David Hudspeth
*Assistant Examiner*—Jason Olson
(74) *Attorney, Agent, or Firm*—Pillsbury Winthrop Shaw Pittman LLP

(57) ABSTRACT

There is disclosed a self-supporting-type servo writing apparatus in which a head of a disk drive is used to write a servo pattern on a disk. In the disk drive, the disk is incorporated in which a clock pattern is pre-written as a signal pattern for position detection in a rotation direction. The servo writing apparatus uses the servo pattern written on the disk by a write head device to successively add the servo pattern into the whole surface on the disk.

14 Claims, 4 Drawing Sheets

METHOD AND APPARATUS FOR SERVO WRITING IN A DISK DRIVE

CROSS-REFERENCE TO RELATED APPLICATIONS

This application is based upon and claims the benefit of priority from the prior Japanese Patent Application No. 2002-223524, filed Jul. 31, 2002, the entire contents of which are incorporated herein by reference.

BACKGROUND OF THE INVENTION

1. Field of the Invention

The present invention relates to disk drives, in particular, to a servo writer and servo write method for recording servo information (servo pattern) on a disk medium.

2. Description of the Related Art

In general, a disk drive, represented by a magnetic disk drive, has a constitution in which a disc-shaped disk is used as a recording medium, and data is recorded on the disk by a head (magnetic head), or reproduced from the disk.

To record/reproduce data, the head needs to be moved to and positioned in a target position (track position to read/write the data). In the disk drive, a servo system (CPU is a main device) for executing a head positioning control is incorporated. In the servo system, servo information (servo pattern) recorded beforehand on the disk is used to execute the head positioning control.

In the disk drive, the servo patterns are recorded as magnetic servo signals in areas (servo areas) disposed at predetermined intervals (sectors) on the disk.

A manufacturing process of the disk drive includes a servo write process of recording the servo patterns on the disk. For a servo write method, in general, an exclusive-use servo writer apparatus (hereinafter referred to also as a servo track writer (STW)) is used.

In general, the STW includes: an external positioning mechanism, referred to as a positioner, for operating the head incorporated in the disk drive to position the head in the target position on the disk; a clock head; and a servo pattern write circuit. The clock head is used for determining a write timing of the servo pattern.

In the servo write process, this STW is used to execute a write operation of the servo pattern in a state in which a top cover of the disk drive is removed. Therefore, the operation of the servo write process is usually performed in a clean room.

After all the servo patterns are recorded on the disk by the servo write process, the disk drive is removed from the STW. Furthermore, the disk drive is subjected to an attaching process of the top cover and a circuit board, and shifted to a process of function verification.

In the servo write method using the STW, especially the following problem has become pronounced in recent years.

A first problem is that with enhancement of a recording density of the disk drive, high track densification on the disk has been promoted, and the number of tracks for recording the servo patterns has increased. Therefore, a time required for the write operation of the servo patterns per one unit of the disk drive has increased.

One STW is exclusively used by a disk drive until all the servo patterns are written. Therefore, naturally, with the increase of the write time of the servo patterns, the number of STWs needs to be increased in order to enhance efficiency of the servo write process. Especially, to raise the manufacturing yield of disk drives, the number of STWs needs to be further increased.

Moreover, since the operation of the servo write process is performed in a clean room, as described above, it is also necessary to increase the number of clean rooms with the increase of the number of produced disk drives. In short, an increase of the STWs and clean rooms causes an increase in manufacturing costs of the disk drives.

A second problem relates to write accuracy of the servo patterns.

The STW drives/controls an actuator incorporated in the disk drive by the positioner, and executes the positioning control of the head mounted on the actuator. That is, a servo system of the STW feeds back a relative error between the position of the positioner and the target position on the disk, as a control amount, to the positioning control mechanism. In the positioning control mechanism, the position of the positioner is maintained with respect to the target position at high accuracy in order to obtain an operation amount so that the relative error is reduced.

However, in order to write the servo patterns on the disk with high accuracy, the position of the head incorporated in the disk drive with respect to the disk needs to be observed. The existing STW does not include this function. Even when the position of the positioner is controlled with high accuracy, the error of the relative position between the head and disk cannot necessarily be reduced.

Moreover, in the disk drive, the disk is a rotary member attached to a spindle motor, and constantly causes a position fluctuation. Unless the head position is allowed to accurately follow the position fluctuation, the write accuracy of the servo patterns cannot be enhanced.

To solve the above-described problem, a servo write method has been proposed comprising: writing the servo patterns while the top cover is attached to the disk drive, without using any external positioning mechanism such as the positioner. In short, the method is basically referred to as a self-supporting type servo write method (self servo write method) of recording the servo patterns on the disk in a self-supporting manner by the disk drive itself, or a recording servo write method.

Concretely, the following prior arts have been proposed.

A first prior art (see Jpn. Pat. Appln. KOKAI Publication No. 8-212733) is a method comprising: using the head incorporated in the disk drive; determining a timing of the disk in a rotation direction and the head position in a disk radial direction; and recording the servo patterns on the disk in a self-supporting manner.

This method is superior in cost, because it is not necessary to use any external positioner or clock head. In the method, the servo patterns can be written while constantly observing the relative position between the disk and head in the radial direction. Therefore, a high write accuracy can be obtained.

However, the method is easily influenced by jitters by disk rotation, because the writing timing of a disk rotation direction is determined in a self-supporting manner. Furthermore, with an increase of frequencies of the servo patterns, there is a possibility that the servo patterns cannot be connected to one another in joints of tracks. In short, there is a problem of clocking accuracy.

A second prior art (see Jpn. Pat. Appln. KOKAI Publication No. 2001-143416) is a method comprising: a step of writing a servo burst pattern by the servo writer apparatus connected to the disk drive; and a step of using the burst pattern to self-write a final servo burst pattern by the head of the disk drive. This method is also referred to as a partial pre-write recording servo write method.

This method is a recording method which additionally requires a step of performing a pre-write (preliminary write) operation. However, with the use of the pre-write pattern, there is an advantage that track feed pitches can be calibrated. Therefore, there is a possibility that track intervals can correctly be held based on the servo patterns recorded on the disk.

However, this method is also easily influenced by the jitters by the disk rotation, because the write timing of the disk rotation direction is determined in a self-supporting manner. Furthermore, with the increase of the frequencies of the servo patterns, there is the possibility that the servo patterns cannot be connected to one another in the joints of the tracks. In short, there is a problem of clocking accuracy.

In addition to the above-described prior arts, as a third prior art (see Jpn. Pat. Appln. KOKAI Publication No. 2001-243733), a self-supporting servo write method called a magnetic transfer method has been proposed. This method comprises: transferring a servo reference pattern onto the disk by magnetic printing; and attaching the disk to the disk drive. The method further comprises: performing a head tracking operation and clocking operation based on the magnetic printing while writing the servo patterns over the whole surface of the disk.

This method is not easily influenced by the jitters of the disk rotation, and the clocking accuracy is relatively satisfactory. However, since the process of magnetic printing is required, there is a problem in the manufacturing cost. For the tracking operation (positioning operation) of the head, since original board recording is used in a magnetic printing technique, a high accuracy cannot be obtained. This method includes a step of processing an original board, and this processing accuracy determines the write accuracy of the servo reference pattern by the magnetic printing. In short, it is difficult to apply the method to future servo patterns having a high track density.

As a fourth prior art (see Jpn. Pat. Appln. KOKAI Publication No. 1-208777), a transfer-type self-supporting servo write method has been proposed using the disk in which sector servo patterns are written. Here, this method is referred to as a sector pattern type transfer servo write method.

This method comprises: recording the servo reference pattern on the disk by another apparatus; and attaching the disk to the disk drive. The method further comprises: performing the head tracking operation and clocking operation based on the servo reference pattern while writing the servo pattern in the whole surface of the disk.

In this method, in the same manner as in the magnetic transfer-type method, since the servo reference pattern is used in the clocking operation, the correct timing can be obtained. However, since the sector servo pattern is used, a time for writing the servo reference pattern increases with the improvement of the recording density. Therefore, there is a problem in the manufacturing cost.

As described above, in short, in the prior-art self-supporting servo write method, the manufacturing cost can be reduced, as compared with the method using the exclusive-use STW and clean room. However, the recording method and the partial pre-write recording servo write method have the problem that the clocking accuracy is low. The magnetic transfer type method has the problem that the tracking accuracy of the head is low. Furthermore, in the sector pattern type transfer servo write method, the clocking accuracy and tracking accuracy are satisfactory, but there is the problem that it is difficult to reduce the manufacturing cost.

BRIEF SUMMARY OF THE INVENTION

In accordance with one embodiment of the present invention, there is provided a servo writing apparatus in which a head incorporated in a disk drive can be used to write servo patterns on a disk at a high accuracy in an apparatus in which a self-supporting-type (self) servo write method is realized.

The servo writing apparatus records servo patterns on a disk medium incorporated in a disk drive including: the disk medium in which a pattern for detecting a position of a rotation direction is recorded; and a head. The head includes a read head device and write head device. A positional relation between the read head device and write head device relatively deviates in an inner or outer peripheral direction of the disk medium in a constitution of the disk drive. The servo writing apparatus comprises: detection means for detecting a position of the head positioned on the disk medium in the rotation direction based on the pattern for position detection read by the read head device; servo pattern write means for writing the servo pattern as a reference for one rotation in the position by the write head device based on a detected result from the detection means, when the head is moved to an innermost peripheral position or an outermost peripheral position on the disk medium, so that the servo pattern is additionally and successively recorded every rotation in the outer or inner peripheral direction from the servo pattern; and head positioning control means for executing a positioning control of the head, when the servo pattern recorded on the disk medium is read by the read head device, and the additional recording operation is performed based on the servo pattern.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described hereinafter with reference to the drawings.

(Constitution of System)

Figure 1:
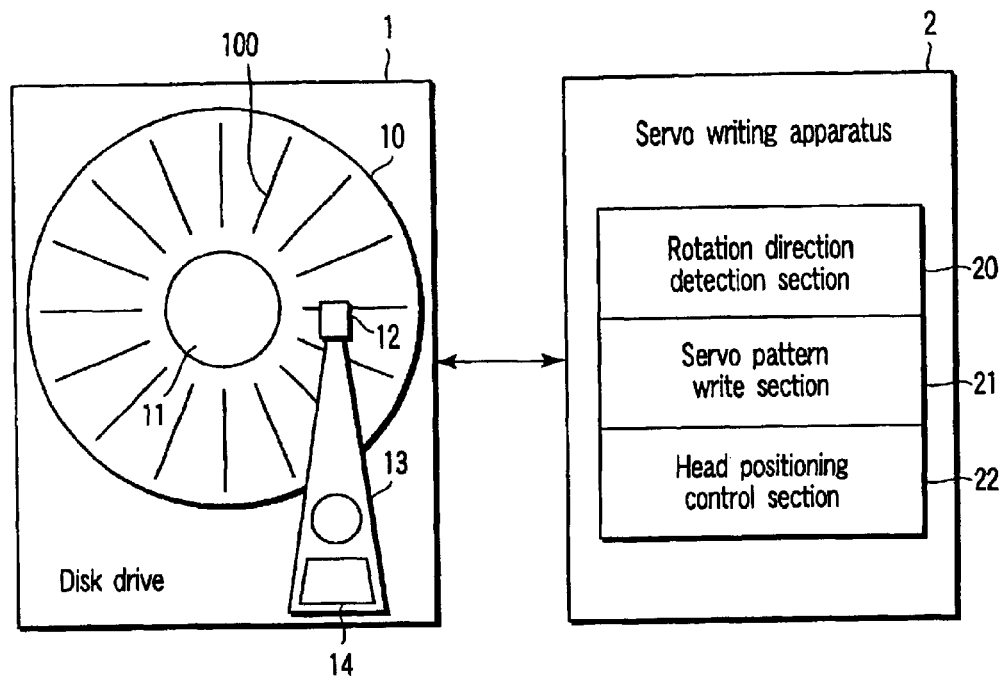
FIG. 1 is a block diagram showing a self-supporting servo write system according to an embodiment of the present invention.

FIG. 1 shows a self-supporting servo write system according to an embodiment of the present invention. The system is constituted of: a disk drive 1; and a servo writing apparatus 2.

The disk drive 1 incorporates a disk 10, which is attached to a spindle motor (SPM) 11 and rotated, and a head 12 mounted on an actuator 13. The actuator 13 includes a mechanism which is driven by a voice coil motor (VCM) 14 and which moves the head 12 in a radial direction on the disk 10.

In one surface of the disk 10, patterns 100 for detecting the position of a rotation direction is recorded beforehand. The patterns for detecting the position 100 are clock patterns recorded at predetermined intervals in a peripheral direction. Concretely, the patterns correspond to PLL synchronous data patterns for use in a reproduction operation of user data on the disk 10.

Figure 5:
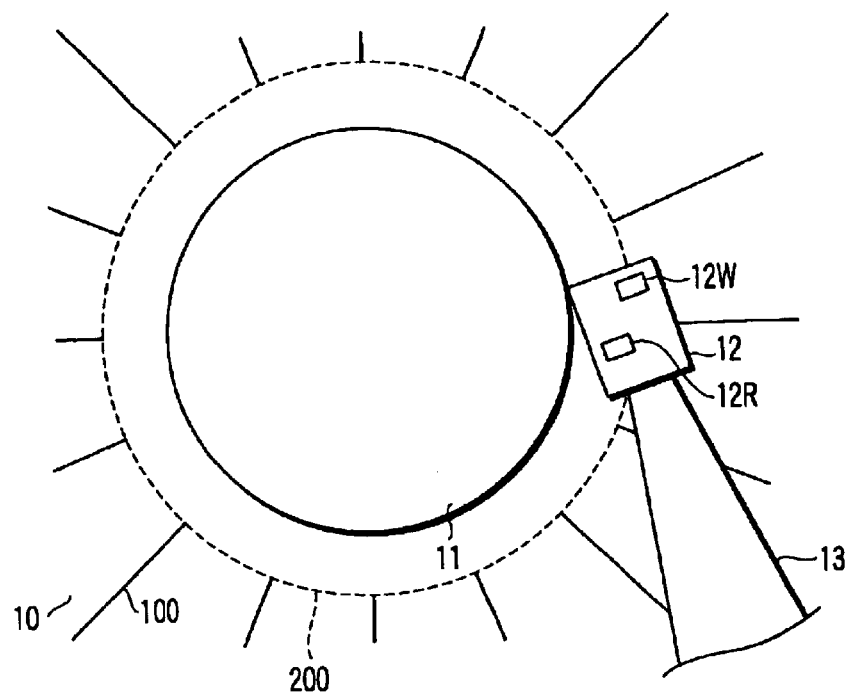
FIG. 5 is a partially enlarged view of FIG. 4, showing a positional relation between read/write head devices according to the embodiment.

As shown in FIG. 5, the head 12 includes a read head device 12R for performing a read operation, and a write head device 12W for performing a write operation. Here, the read head device 12R has a positional relation with respect to the write head device 12W such that the read head device is relatively disposed in an inner peripheral direction.

The above-described mechanism is incorporated in the disk drive 1. A sealed state is assumed in which a top cover is attached.

On the other hand, the servo writing apparatus 2 includes a communication function of exchanging a servo signal corresponding to a servo pattern and a clock pattern read by the read head device 12R with the disk drive 1.

The servo writing apparatus 2 includes a rotation direction detection section 20, a servo pattern write section 21, and a head positioning control section 22. The rotation direction detection section 20 counts clocks of the clock pattern 100 read by the read head device 12R of the disk drive 1 for detecting the position of the head 12 in the rotation direction on the disk 10 rotated by the SPM 11. In short, the rotation direction detection section 20 detects the position of the head 12 with respect to one rotation of the disk 10.

The servo pattern write section 21 is a circuit which supplies the servo signal for writing servo information (servo pattern) onto the disk 10 by the write head device 12W. The servo information includes a track code (cylinder code) for identifying a track, and a servo burst pattern for use in a positioning operation (track follow operation) in the track.

The head positioning control section 22 is a servo system which executes a positioning control of the head 12 based on the servo pattern read by the read head device 12R. This servo system has basically the same constitution as that of a servo system (CPU is a main device) incorporated in the disk drive 1. The head positioning control section 22 schematically includes a feedback control system shown in FIG. 8.

As described above, in short, in the system of the present embodiment, a positioner which is an external positioning mechanism, and a clock head are not used. Since the disk drive 1 is in the sealed state, a clean room is not required at a servo write process time.

(Servo Write Process)

A write procedure of the servo pattern in the servo write process of the present embodiment will be described hereinafter with reference to FIGS. 2 to 6 together with FIG. 1.

Figure 3:
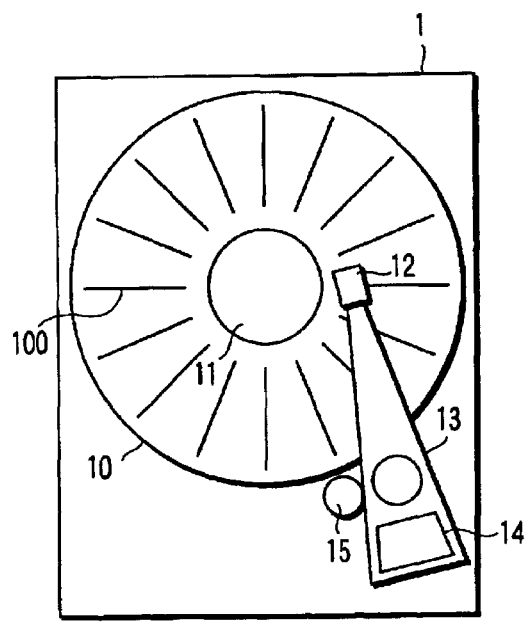
FIG. 3 is an explanatory view showing an initial operation of a servo writing apparatus according to the present embodiment.

The head positioning control section 22 of the servo writing apparatus 2 drives the VCM 14 of the disk drive 1 to move the actuator 13 in the inner peripheral direction of the disk 10 (step S1). As shown in FIG. 3, the head positioning control section 22 moves the actuator 13 until the actuator abuts on a stopper 15 on an inner peripheral side. Accordingly, the head 12 is maintained in the position of an innermost periphery of the disk 10.

Next, the rotation direction detection section 20 inputs the clock pattern (clock pulse) read by the read head device 12R of the head 12, and detects a rotation speed of the disk 10 and the position of the head 12 in the rotation direction (steps S2, S3). The rotation direction detection section 20 counts the clock pulses read by the read head device 12R.

With the position of the head 12 (i.e., the write head device 12W) in the rotation direction, detected by the rotation direction detection section 20, and at a timing based on the rotation speed of the disk 10, the servo pattern write section 21 writes a servo pattern 200 as a reference (hereinafter referred to as the reference pattern) (step S4).

Figure 4:
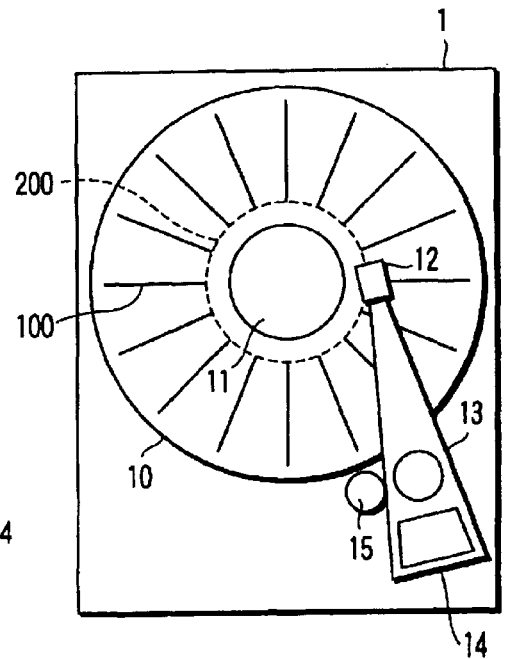
FIG. 4 is an explanatory view of a servo write process of a reference servo pattern according to the present embodiment.
Figure 2:
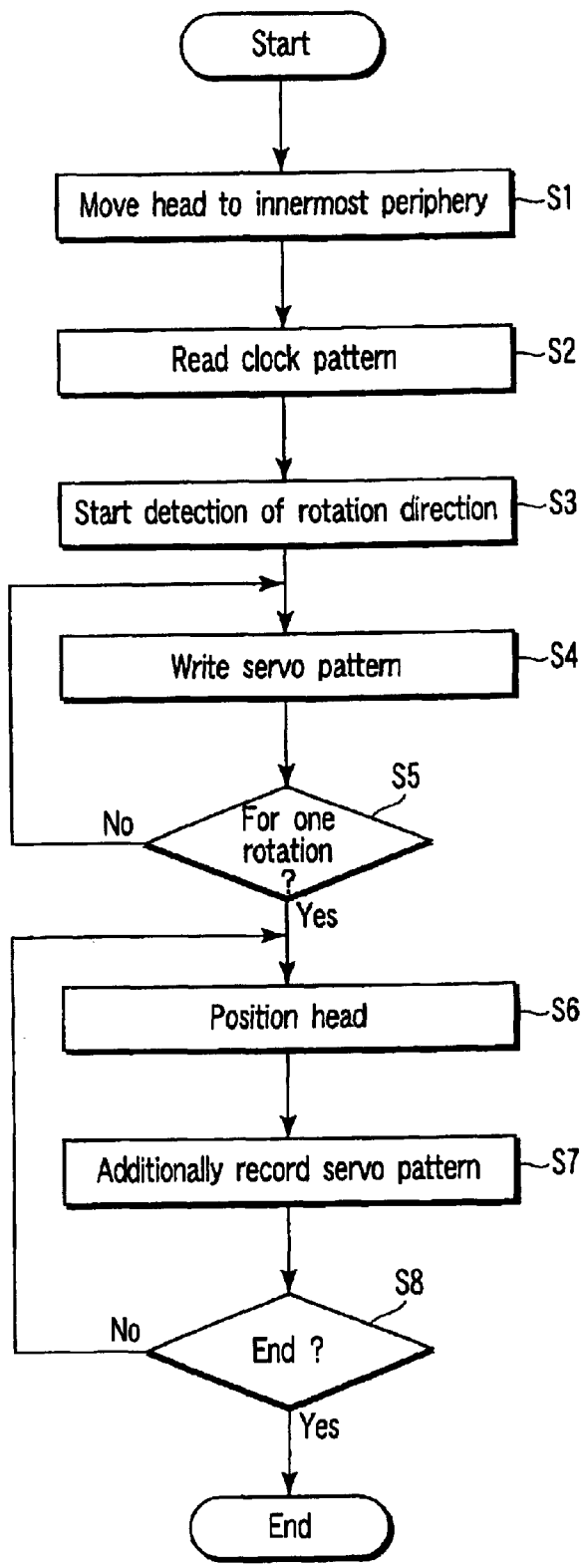
FIG. 2 is a flowchart showing a procedure of a write operation of a servo pattern according to the present embodiment.

As shown in FIGS. 4 and 5, the servo pattern write section 21 writes the reference pattern 200 for one rotation of the innermost periphery of the disk 10 via the write head device 12W (YES in step S5). As described above, the reference pattern 200 is servo information including the track code (cylinder code) and the servo burst pattern.

Next, the head positioning control section 22 uses the reference pattern 200 read by the read head device 12R to move the head 12 in an outer peripheral direction, and positions the write head device 12W in the next write position (step S6). That is, as shown in FIG. 5, since the read head device 12R is relatively disposed on the inner peripheral side, the servo pattern written by the write head device 12W can be read out.

Figure 6:
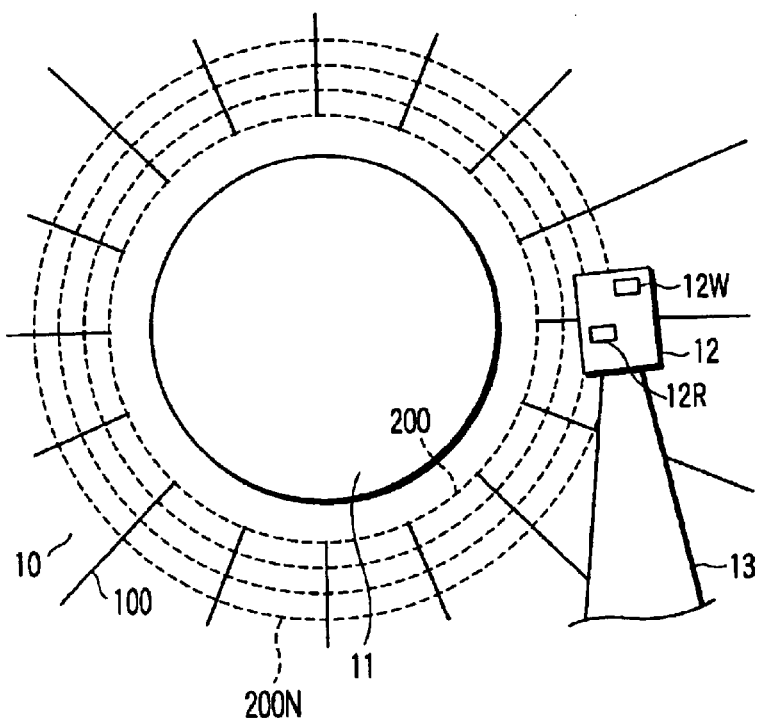
FIG. 6 is an explanatory view of an additional recording operation of the servo pattern according to the present embodiment.

The servo pattern write section 21 writes the servo pattern for one rotation in the position of the outer peripheral direction to follow the reference pattern 200 via the write head device 12W (step S7). That is, as shown in FIG. 6, with the movement of the head 12 by the head positioning control section 22, servo patterns 200N are additionally recorded successively in the outer peripheral direction by the write head device 12W. In the same manner as the reference pattern 200, the servo pattern 200N is the servo information including the track code (cylinder code) and the servo burst pattern.

As described above, the head positioning control section 22 of the servo writing apparatus 2 reads the servo pattern 200N written by the write head device 12W via the read head device 12R, and executes the positioning operation of the head 12 in the outer peripheral direction. The servo pattern write section 21 successively writes the servo pattern 200N for each rotation by the positioned write head device 12W. Finally, the servo pattern 200N is recorded over the whole surface of the disk 10 (YES in step S8).

In short, the servo write method of the present embodiment comprises: writing the servo pattern on the disk 10 in which the clock pattern 100 is recorded beforehand as the pattern for position detection in the rotation direction. In this case, the clock pattern 100 recorded in the whole surface of the disk 10 is used to execute the clocking operation (setting operation of the write timing). Therefore, the clocking accuracy can be inhibited from dropping by the high frequency of the servo pattern or by the influence of rotation jitters of the disk 10.

Here, a pre-write operation of the clock pattern 100 is naturally executed by an exclusive-use apparatus (servo writing apparatus for each disk single plate: MS-STW) for each disk. Moreover, the disk 10 in which the clock pattern 100 is written is incorporated in the disk drive 1. It is to be noted that the exclusive-use apparatus may also be a clock pattern writing apparatus by a magnetic transfer system. The clock pattern 100 can satisfactorily be recorded, when the timing only of the rotation direction is precise. Therefore, a sufficient accuracy of the radial direction is not required. Furthermore, it is not necessary to change the pre-pattern depending on the track density (TPI).

Furthermore, at an initial time, the head 12 is positioned in the innermost periphery of the disk 10, the servo pattern 200 is written as the reference, and subsequently the successively recorded servo patterns are used to position the write head device 12W. Therefore, since the read/write head devices 12R, 12W incorporated in the disk drive 1 are used to write the servo patterns, the servo write method of a self recording type, so to speak, is realized. Accordingly, a sufficient write accuracy of the servo pattern can be secured.

Moreover, as described above, the servo write process can be performed in the sealed state in which the top cover of the disk drive 1 is attached, and therefore the clean room is not required. Not only the clean room but also the positioner which is the external positioning mechanism are unnecessary for the servo writing apparatus 2, and therefore the manufacturing cost can be reduced.

Figure 8:
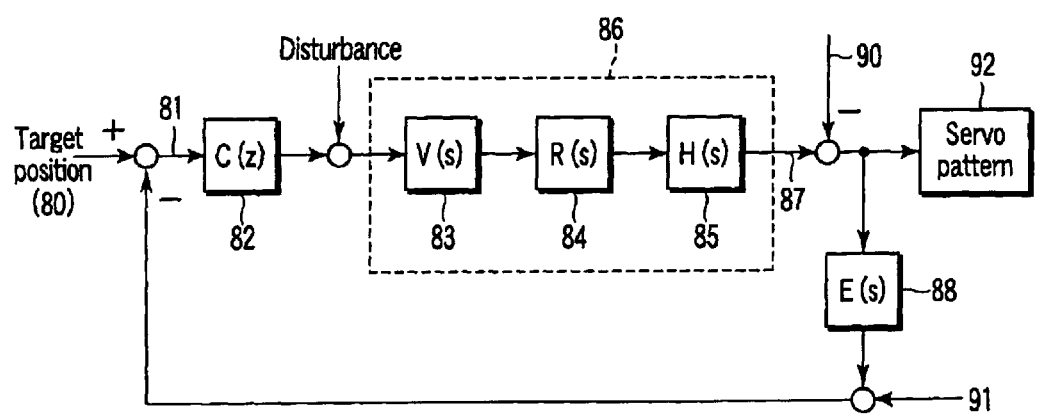
FIG. 8 is a block diagram showing a head positioning control system of the servo writing apparatus according to the present embodiment.

The head positioning control section 22 includes a feedback control system shown in FIG. 8. That is, a control device 82 (transfer function C(z)) calculates an operation amount in accordance with an error 81 between a target position 80 of the head 12 and a detected position (including an observation noise 91) from a position detection device 88 (transfer function E(s)).

A head movement mechanism 86 displaces a head position 87 in accordance with the operation amount from the control device 82. The write head device in the head displacement performs the write operation of a servo pattern 92 on the disk 10. Here, the servo pattern 92 recorded on the disk 10 is influenced by jitters 90 of the SPM 11 which rotates the disk 10. The head movement mechanism 86 includes a VCM 83 (transfer function V(s)), an actuator 84 (transfer function R(s)), and a head 85 (transfer function H(s)).

(Modification Example)

It is to be noted that in the present embodiment in the structure of the head 12, as shown in FIG. 5, the positional relation is assumed in which the read head device 12R is relatively disposed in the inner peripheral direction with respect to the write head device 12W. In a modification example, conversely, the head 12 may have a positional relation in which the read head device 12R is relatively disposed in the outer peripheral direction with respect to the write head device 12W.

Additionally, in the servo writing apparatus 2, the head 12 is positioned in an outermost periphery at the initial time, and the reference pattern 200 is written in an outermost peripheral position of the disk 10. Moreover, a write procedure is performed to add the servo pattern over the whole surface, while the head 12 is successively moved in the inner peripheral direction.

Furthermore, in the present embodiment, the clock pattern 100 is assumed as the pattern for position detection recorded beforehand on the disk 10. The clock pattern 100 corresponds to the PLL synchronous pattern for use in a reproduction operation of user data, but the pattern is not limited to this. In short, any pattern may be used as long as the position of the head 12 in the rotation direction can be detected on the rotating disk 10.

Figure 7:
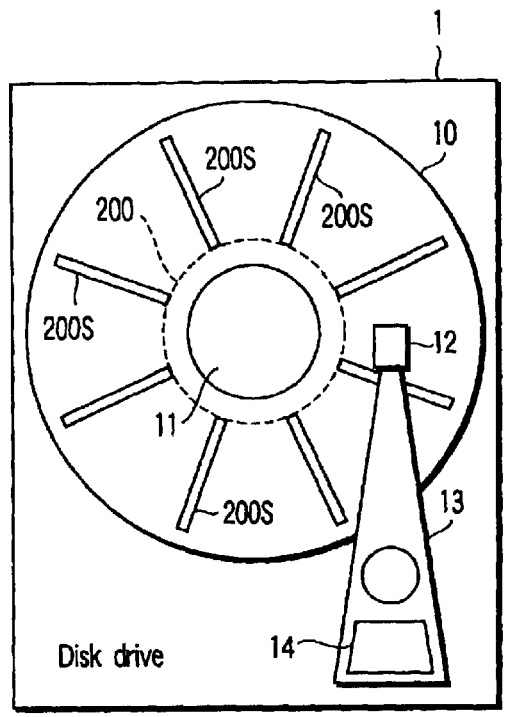
FIG. 7 is a diagram of a disk drive according to the present embodiment, showing that the servo pattern remains by a test process.

FIG. 7 shows that the data is recorded on the disk 10, for example, in a test process after the servo write process and data tracks are constituted. That is, the servo pattern is recorded in the whole surface of the disk 10 by the servo write process according to the present embodiment. By formatting, servo areas 200S by a sector servo system are constituted in the disk drive 1 which is a product.

In brief, by the servo write process, the servo pattern recorded in the whole surface is deleted by overwrite by the constitution of the data track. The predetermined number of servo areas (in which the servo patterns are recorded) 200S remain at predetermined intervals. Therefore, in a usual read/write operation, the servo patterns are read from the servo areas 200S, and the positioning control of the head is executed.

It is to be noted that at the initial time in the servo write process, the reference pattern 200 recorded in the innermost periphery (outermost periphery in the modification example) of the disk 10 is sometimes left as such without being deleted as shown in FIG. 7, even when the formatting is executed.

As described above in detail, the servo write process using the servo writing apparatus of the present embodiment comprises: moving the head to the innermost or outermost periphery on the disk medium; and detecting the position of the head in the rotation direction by the pattern for position detection (e.g., clock pulse) read by the read head device. The process further comprises: writing the servo pattern which is the reference, for example, in the innermost periphery on the disk medium by the write head device.

Here, in the present disk drive, for the head, for example, the read head device is relatively disposed on the inner peripheral side, and the write head device is disposed on the outer peripheral side. The reference servo pattern recorded in the innermost periphery on the disk medium is read by the read head device, and the positioning control of the head is executed based on the reference servo pattern. The write head device positioned by the head positioning control additionally writes the servo patterns successively in the outer peripheral direction from the reference servo pattern. By the above-described servo write process, the servo patterns are recorded in the whole surface on the disk medium.

Consequently, there can be provided a self-supporting type servo writing apparatus and servo write method in which the manufacturing cost is inhibited from increasing and the servo pattern can be written at a high accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A servo writing apparatus which records servo patterns on a disk medium incorporated in a disk drive including a head and the disk medium in which a pattern for position detection in a rotation direction is recorded, the head including a read head device and write head device, the disk drive having a constitution in which a positional relation between the read head device and write head device relatively deviates in an inner or outer peripheral direction of the disk medium, the servo writing apparatus comprising:

detection means for detecting a position of the head positioned on the disk medium in the rotation direction based on the pattern for position detection read by the read head device;

servo pattern write means for writing the servo pattern as a reference for one rotation in the position by the write head device based on a detected result from the detection means, when the head is moved to an innermost peripheral position or an outermost peripheral position on the disk medium, so that the servo pattern is additionally recorded every rotation successively in the outer or inner peripheral direction from the servo pattern; and head positioning control means for executing a positioning control of the head, when the servo pattern recorded on the disk medium is read by the read head device, and the additional recording operation is performed based on the servo pattern.

2. The servo writing apparatus according to claim 1, wherein a clock pattern is recorded as the pattern for position detection in the rotation direction in the whole surface of the disk medium incorporated in the disk drive.

3. The servo writing apparatus according to claim 1, wherein the servo pattern write means writes the servo pattern in the whole surface of the disk medium.

4. The servo writing apparatus according to claim 1, wherein the disk drive includes an actuator mechanism on which the head is mounted and which moves the head in a radial direction on the disk medium, and the head positioning control means drives/controls the actuator mechanism to execute the head positioning control.

5. A disk drive comprising:

a disk medium in which a pattern for position detection in a rotation direction is recorded;

a head including a read head device and a write head device, and having a constitution in which a position relation between the read head device and the write head device relatively deviates in an inner or outer peripheral direction of the disk medium;

an actuator mechanism on which the head is mounted and which moves the head in a radial direction on the disk medium; and a servo writer unit which includes an attachable/detachable structure and which records a servo pattern on the disk medium, the servo writer unit including:

detection means for detecting the position of the head positioned on the disk medium in the rotation direction based on the pattern for position detection read by the read head device;

servo pattern write means for writing the servo pattern as a reference for one rotation in the position by the write head device based on a detected result from the detection means, when the head is moved to an innermost peripheral position or an outermost peripheral position on the disk medium, so that the servo pattern is additionally recorded every rotation successively in the outer or inner peripheral direction from the servo pattern; and head positioning control means for driving/controlling the actuator mechanism to execute a positioning control of the head, when the servo pattern recorded on the disk medium is read by the read head device, and the additional recording operation is performed based on the servo pattern.

6. The disk drive according to claim 5, wherein a clock pattern is recorded as the pattern for position detection in the rotation direction in one surface of the disk medium incorporated in the disk drive.

7. The disk drive according to claim 5, wherein the servo pattern write means writes the servo pattern in the whole surface of the disk medium.

8. The disk drive apparatus according to claim 5, further comprising:

a read/write channel which processes a signal of data read/written on the disk medium by the head, wherein the servo writer unit is incorporated in the read/write channel.

9. The disk drive according to claim 5, wherein after the servo pattern is recorded in the whole surface of the disk medium by the servo writer unit, the servo pattern and clock pattern other than a pattern left as a servo area are deleted by a write operation of the data by the write head device.

10. The disk drive according to claim 5, wherein the servo pattern and clock pattern other than a pattern left as a servo area are deleted from the disk medium, and the servo pattern remains as a reference recorded for one rotation along an innermost or outermost periphery in the disk medium.

11. A servo writing method which records servo patterns on a disk medium with respect to a disk storage apparatus including a head and the disk medium in which a pattern for position detection in a rotation direction is recorded, the head including a read head device and write head device, the disk storage apparatus having a constitution in which a positional relation between the read head device and write head device relatively deviates in an inner or outer peripheral direction of the disk medium, the servo writing method comprising:

moving the head to an innermost peripheral position on the disk medium;

detecting the position of the head positioned on the disk medium in the rotation direction based on the pattern for position detection read by the read head device;

writing the servo pattern as a reference for one rotation in the position by the write head device based on a detected result by the detecting step, while the head is kept in an innermost peripheral position on the disk medium;

reading the servo pattern recorded on the disk medium by the read head device, and moving the head in the outer peripheral direction from the innermost peripheral position based on the servo pattern; and adding the servo pattern every rotation successively in the outer peripheral direction with the movement of the write head device.

12. The method according to claim 11, further comprising:

moving the head to an outermost peripheral position on the disk medium at an initial time;

writing the servo pattern as a reference for one rotation in the position by the write head device based on a detected result by the detecting step, while the head is kept in an outermost peripheral position on the disk medium; and reading the servo pattern recorded on the disk medium by the read head device, and moving the head in the inner peripheral direction from the outermost peripheral position based on the servo pattern.

13. The method according to claim 11, further comprising:

recording a clock pattern as the pattern for position detection in the rotation direction on one surface of the disk medium incorporated in the disk storage apparatus.

14. The method according to claim 11, further comprising:

writing the servo pattern in the whole surface of the disk medium so that the servo pattern is additionally recorded.

* * * * *